United States Patent
Durocher et al.

(10) Patent No.: US 8,596,959 B2
(45) Date of Patent: Dec. 3, 2013

(54) OIL TUBE WITH INTEGRATED HEAT SHIELD

(75) Inventors: Eric Durocher, Vercheres (CA); John Watson, St. Lambert (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 1090 days.

(21) Appl. No.: 12/576,261

(22) Filed: Oct. 9, 2009

(65) Prior Publication Data

US 2011/0085895 A1    Apr. 14, 2011

(51) Int. Cl.
*F01D 11/00*    (2006.01)

(52) U.S. Cl.
USPC .................... 415/110; 415/116; 415/178

(58) Field of Classification Search
USPC ................ 415/110, 116, 177, 178; 416/93 R
See application file for complete search history.

(56) References Cited

U.S. PATENT DOCUMENTS

| | | | |
|---|---|---|---|
| 1,476,537 A * | 12/1923 | Moon | 228/17 |
| 2,546,937 A | 3/1951 | Wyandt et al. | |
| 3,662,959 A | 5/1972 | Sample, Jr. | |
| 4,369,016 A | 1/1983 | Dennison | |
| 4,467,610 A | 8/1984 | Pearson et al. | |
| 4,478,551 A | 10/1984 | Honeycutt, Jr. et al. | |
| 4,501,302 A | 2/1985 | Harwood | |
| 4,531,552 A | 7/1985 | Kim | |
| 4,566,495 A | 1/1986 | Baker et al. | |
| 4,619,292 A | 10/1986 | Harwood | |
| 4,656,712 A | 4/1987 | Harwood et al. | |
| 4,987,736 A | 1/1991 | Ciokajlo et al. | |
| 5,269,468 A | 12/1993 | Adiutori | |
| 5,335,490 A | 8/1994 | Johnson et al. | |
| 6,149,075 A | 11/2000 | Moertle et al. | |
| 6,354,085 B1 * | 3/2002 | Howell et al. | 60/740 |
| 6,357,222 B1 * | 3/2002 | Schilling et al. | 60/800 |
| 6,398,485 B1 * | 6/2002 | Frosini et al. | 415/115 |
| 6,398,518 B1 * | 6/2002 | Ingistov | 417/244 |
| 6,622,383 B1 | 9/2003 | Moertle et al. | |
| 6,884,023 B2 * | 4/2005 | Dube et al. | 415/116 |
| 6,890,147 B2 * | 5/2005 | Pecchioli | 415/115 |
| 7,305,830 B2 | 12/2007 | Fish | |
| 7,320,212 B2 | 1/2008 | Fish et al. | |
| 7,451,599 B2 | 11/2008 | Fish et al. | |
| 2007/0107434 A1 * | 5/2007 | Prociw et al. | 60/740 |
| 2009/0097963 A1 * | 4/2009 | Evans | 415/116 |

FOREIGN PATENT DOCUMENTS

EP    2048325 A2 *    4/2009

* cited by examiner

*Primary Examiner* — Edward Look
*Assistant Examiner* — Aaron R Eastman
(74) *Attorney, Agent, or Firm* — Norton Rose Fulbright Canada LLP

(57) ABSTRACT

A gas turbine engine has an oil tube for delivering oil through a high temperature zone of the engine to an engine component for cooling and lubrication. An insulation tube surrounds the oil tube and extends in a substantial length of the oil tube. The opposed ends of the insulation tube are integrally and sealingly connected to respective end portions of the oil tube to form a dead air annulus between the oil tube and the insulation tube.

16 Claims, 4 Drawing Sheets

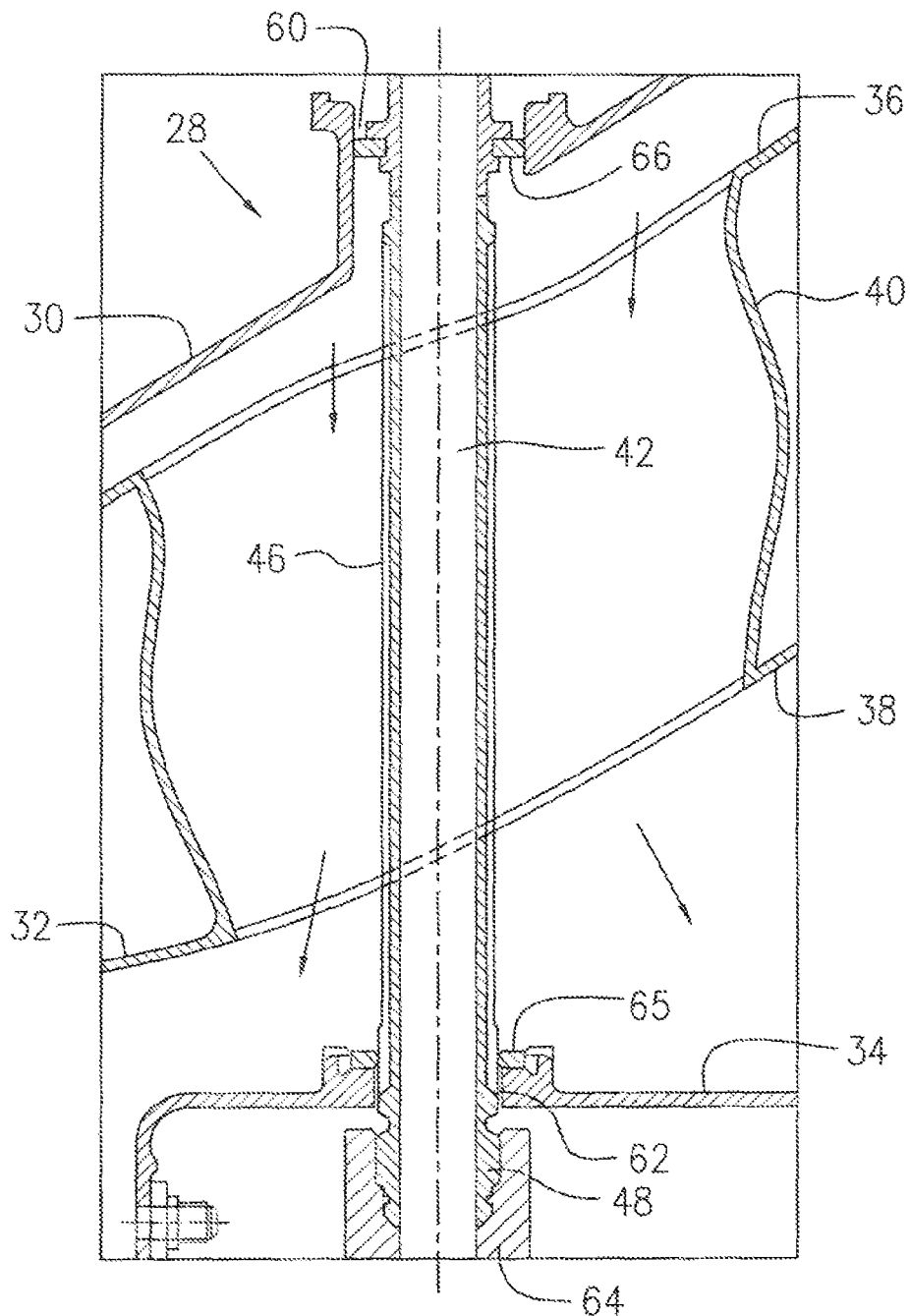
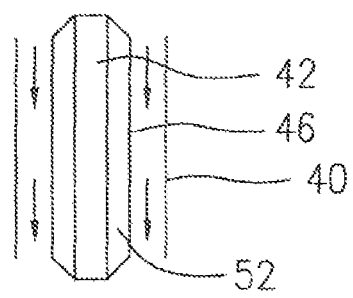
FIG. 3
FIG. 4

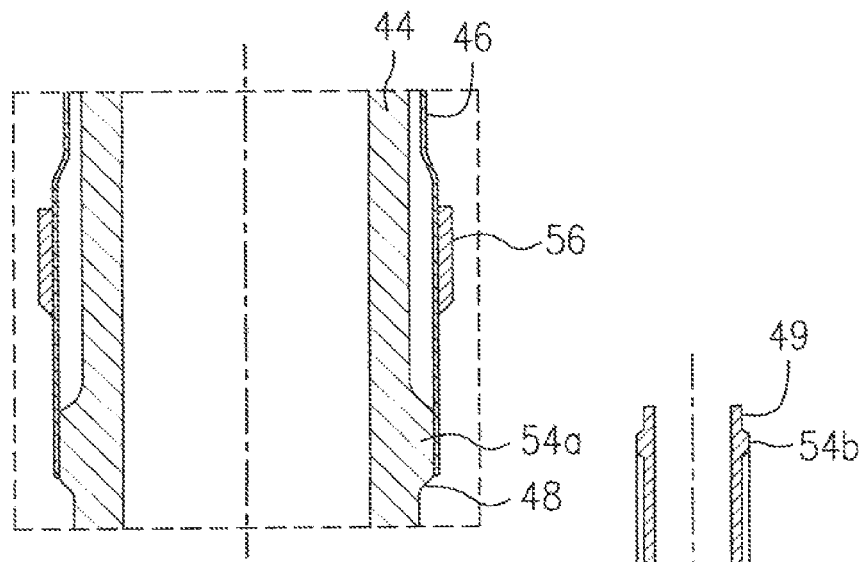
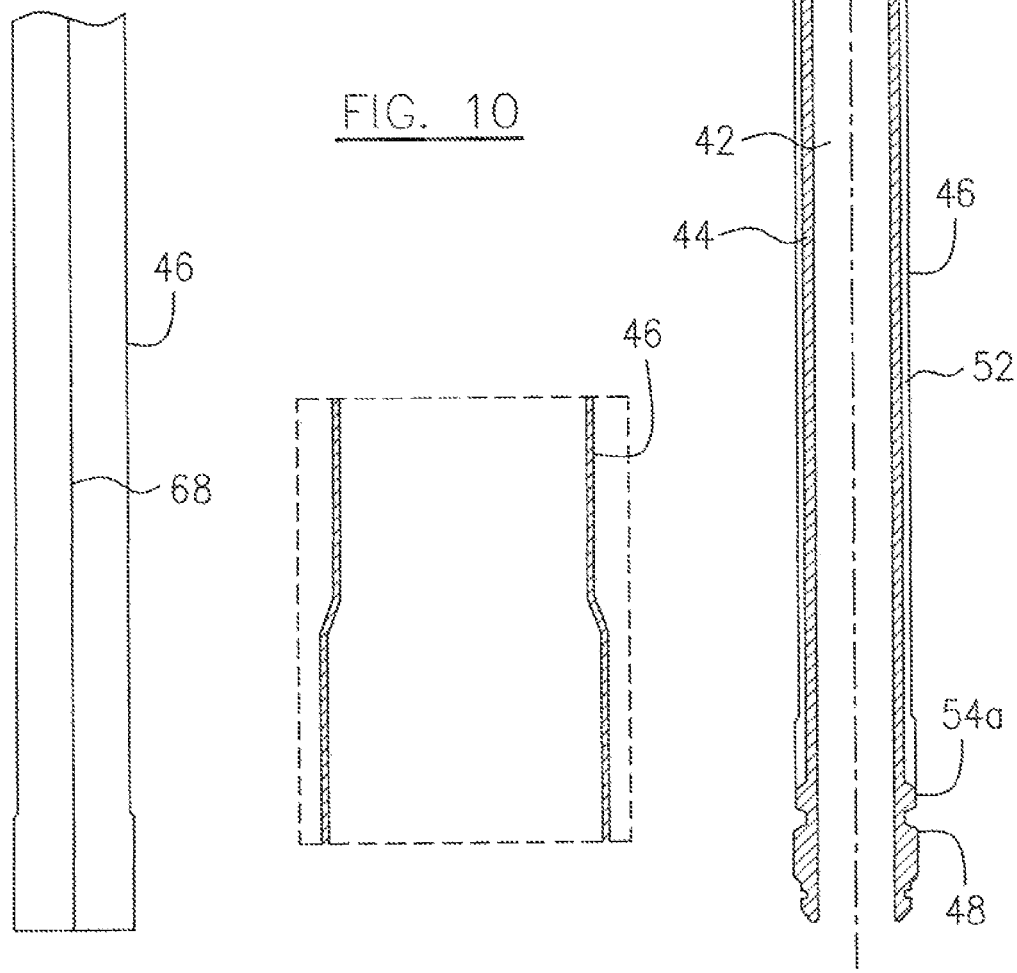
FIG. 10
FIG. 7  FIG. 8  FIG. 9

OIL TUBE WITH INTEGRATED HEAT SHIELD

TECHNICAL FIELD

The invention relates generally to gas turbine engines and, more particularly, to a gas turbine engine having a heat insulation system for an oil tube.

BACKGROUND OF THE ART

A mid turbine frame (MTF), sometimes referred to as an inter turbine frame, is located generally between turbine stages of a gas turbine engine to support one or more bearings and to transfer bearing loads through to the outer engine case, and also to form an inter-turbine duct (ITD) for directing a hot gas flow to the downstream rotor. It is conventional to have a conduit carrying a lubricant fluid to pass through one of the radial hollow airfoils disposed in the ITD. The airfoils are exposed to the hot gas flow in the ITD and therefore an insulation system is demanded for the conduit because the hot temperature may cause lubricant degradation or even lubricant ignition if lubricant leakage occurs. Conventional insulation systems for oil lines in MTF has relatively complicated structures which demand spaces and weights.

Accordingly, there is a need to provide an improved oil tube insulation.

SUMMARY

According to one aspect, provided is a gas turbine engine comprising an array of hollow airfoils within an annular duct supported in an engine case assembly and a heat insulation system for an oil tube extending through one of the hollow airfoils, the heat insulation system including an insulation tube surrounding the oil tube and extending substantially along a length of the oil tube, the insulation tube having one of a weld and a braze joint at each of its opposed ends which integrally and sealingly connect the insulation tube to the oil tube, thereby defining a dead air annulus between the oil tube and the insulation tube.

According to another aspect, provided is a gas turbine engine having an oil tube for delivering oil through a high temperature zone of the engine to an engine component, the oil tube comprising: a tubular body extending in a substantial length of the oil tube and axially between opposed end portions, each of the end portions including an annular shoulder extending radially outwardly with respect to the tubular body; and an insulation tube surrounding the tubular body, the insulation tube having opposed ends integrally and sealingly affixed to the respective annular shoulders, thereby defining a sealed annulus between the tubular body and the insulation tube.

According to a further aspect, provided is a method for fabricating an oil tube with integrated heat shield for a gas turbine engine, comprising (a) providing an oil tube having an annular shoulder located at each of opposed ends of the oil tube, the shoulders radially outwardly extending with respect to a tubular body which extends between the opposed ends; (b) providing an insulation tube; (c) inserting the oil tube into the insulation tube until the two shoulders are adjacent to opposed ends of the insulation tube, respectively; and (d) securing the ends of the insulation tube to the respective shoulders by applying one of weld and braze.

Further details of these and other aspects of the describe subject matter will be apparent from the detailed description and drawings included below.

DESCRIPTION OF THE DRAWINGS

Reference is now made to the accompanying drawings, in which:

FIG. 3 is a partial cross-sectional view of a mid turbine frame of the gas turbine engine in FIG. 1 showing the oil tube of FIG. 2 extending through a radial hollow airfoil disposed in a hot gas path;

FIG. 4 is a schematic illustration of heat insulation provided to the oil tube in the mid turbine frame of FIG. 3;

FIG. 7 is a partial side elevational view of the insulation tube which forms a heat shield of the oil tube of FIG. 2;

FIG. 8 is a partial cross-sectional view of the insulation tube of FIG. 7, in an enlarged scale to show a flared end portion of the insulation tube;

FIG. 9 is a cross-sectional view of the oil tube of FIG. 2 in an assembly procedure; and FIG. 10 is a cross-sectional view of a circled area 10 of the oil tube of FIG. 2 showing in an enlarged scale a metal sleeve affixed around the insulation tube of the oil tube.

DETAILED DESCRIPTION

Figure 1:
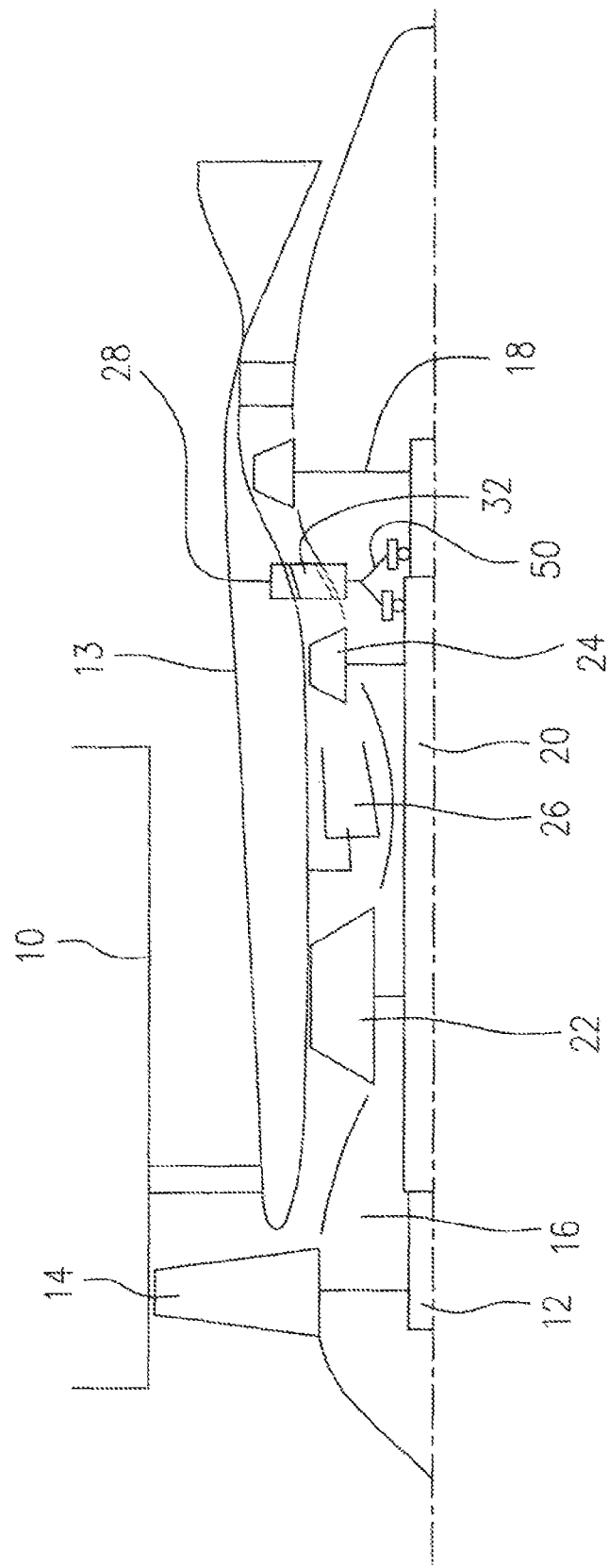
FIG. 1 is a schematic cross-sectional view of a turbofan gas turbine engine according to the present description.

Referring to FIG. 1, a bypass gas turbine engine includes a fan case 10, a core casing 13, a low pressure spool assembly which includes a fan assembly 14, a low pressure compressor assembly 16 and a low pressure turbine assembly 18 connected by a shaft 12 and a high pressure spool assembly which includes a high pressure compressor assembly 22 and a high pressure turbine assembly 24 connected by a turbine shaft 20. The core casing 13 surrounds the low and high pressure spool assemblies to define a main fluid path therethrough. In the main fluid path there is provided a combustor 26 which generates combustion gases to power the high pressure turbine assembly 24 and the low pressure turbine assembly 18. A mid turbine frame (MTF) 28 includes an inter-turbine duct (ITD) 32 disposed between the high pressure turbine assembly 24 and the low pressure turbine assembly 18 and supports a bearing housing 50 for accommodating bearings around the respective shafts 20 and 12.

Referring to all the drawings, the MTF 28 according to this embodiment includes an annular outer case 30 which may be a part of the core casing 13. An annular inner case 34 is co-axially supported within the outer case 30. The bearing housing 50 (only shown in FIG. 1) is co-axially supported and connected to the inner case 34.

The ITD 32 is supported within the MTF 28 and defines an annular hot gas path (not numbered) between the annular outer duct wall 36 and annular inner duct wall 38 for conducting hot gases to pass therethrough, as shown in FIG. 3. An array of hollow airfoils 40 are provided, extending radially across the ITD 32 and interconnecting the outer and inner duct walls 36, 38.

An oil tube 42 extends radially with respect to an engine axis through the ITD 32 by one of the hollow airfoils 40 and supported by the respective outer and inner cases 30, 34. The oil tube 42 is connected to an oil system for delivery of oil to the bearing housing 50. The oil tube 42 is in a high temperature environment because the hollow airfoil 40 accommodating the oil tube 42 is exposed directly to the hot gas flow passing through the ITD 32.

The oil tube 42 according to one embodiment has an insulation tube 46 surrounding the oil tube 42 and extending in a substantial length of the oil tube. The insulation tube 46 has opposed ends integrally and sealingly connected to the respective opposed end portions 48, 49 of the oil tube 42 to provide an integrated heat shield defined by a dead air annulus 52 (more clearly shown in FIG. 4) between the oil tube 42 and the insulation tube 46. For example, the oil tube 42 may include a tubular body 44 extending in a substantial length of the oil tube 42 and axially between the opposed end portions 48, 49. Each of the end portions 48, 49 may include an annular shoulder 54a or 54b extending radially outwardly with respect to the tubular body 44. The opposed ends of the insulation tube 46 are integrally and sealingly, for example, welded or brazed to the respective shoulders 54a, 54b. Therefore, the annulus 52 defined between the insulation tube 46 and the tubular body 44 of the oil tube 42 is completely sealed and a layer of dead air contained in the annulus 52 forms a heat insulation layer protecting the oil flow passing through the oil tube 42 from heat radiation.

The insulation tube 46 may have a tubular wall thinner than the wall of the tubular body 44 of the oil tube 42. For example, the insulation tube 46 may be made of sheet metal.

In this embodiment, the insulation tube 46 may further include a metal sleeve 56 (more clearly shown in FIG. 10) around and affixed such as by welding or brazing to an outer surface at one end of the insulation tube 46, close to the end portion 48 of the oil tube 42. The metal sleeve 56 may have a machined annular outer surface to provide a round sealing surface which will be further described hereinafter.

Optionally, a tube connector 58 such as a ferrule may be affixed, for example, by welding or brazing to the end portion 49 of the oil tube 42.

Figure 5:
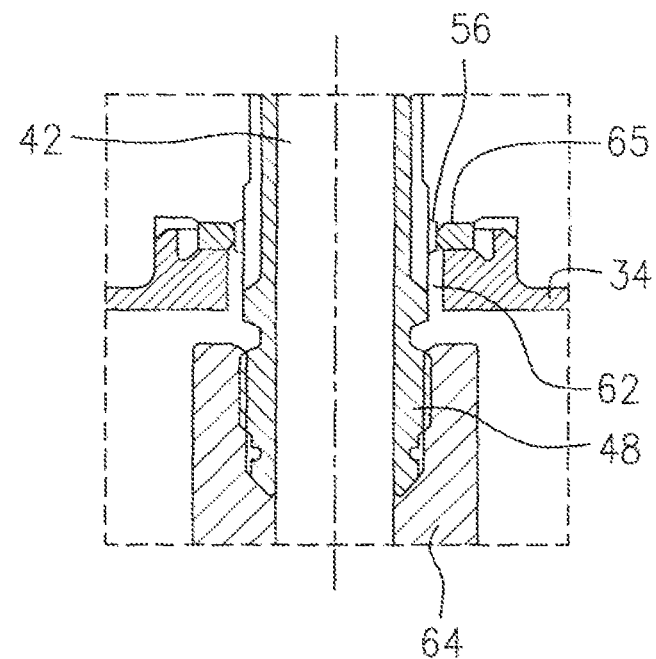
FIG. 5 is a partial cross-sectional view in an enlarged scale of the mid turbine frame of FIG. 3, showing an inner end of the oil tube received in an opening of an annular inner case of the mid turbine frame.

The oil tube 42 with the integrated insulation tube 46 in this embodiment may be inserted radially inwardly through an opening 60 defined in the outer case 30, one of the hollow airfoils 40 (as shown in FIG. 3.) and an opening 62 defined in the inner case 34 such that the end portion 48 is disposed within the inner case 34 and connected to an oil passage port 64 of the bearing housing (more clearly shown in FIG. 5) and the connector 58 projects radially outwardly from the outer case 30 for connection with an oil line of the engine oil system (not shown).

Optionally, a seal arrangement indicated by numeral 65 may be provided between the machined annular outer surface of the metal sleeve 56 and the opening 62 defined in the inner case 34. A seal ring of the seal arrangement 65 will block oil leakage and keep the outer surface of the insulation tube 46 dry, if oil leakage occurs at the interface between the end portion 48 of the oil tube 42 and the oil passage port 64. Leaked oil on the outer surface of the insulation tube 46 may cause oil ignition because the insulation tube 46 is relatively hot, affected by the heat radiation from the hot gas flow passing through the ITD 32 and around the hollow airfoils 40. Therefore, the seal arrangement 65 effectively eliminates the risk of oil ignition if such oil leakage occurs.

Optionally, another seal arrangement indicated by numeral 66 may be provided between the connector 58 and the opening 60 defined in the outer case 30 to prevent cooling air leakage from the opening 60 of the outer case 30 when cooling air such as the compressor air P3 is introduced into the annular cavity (not numbered) around the ITD 32 and to pass through the hollow airfoils 40, thereby cooling the oil tube 42 with the integrated insulation tube 46, as indicated by arrows in FIGS. 3 and 4.

The insulation tube 46 may be made from a piece of sheet metal which is rolled to form a cylindrical tube. A weld or braze may be then applied to seal an axial seam 68 of the cylindrical tube of the sheet metal, as shown in FIG. 7. Optionally, one end of the cylindrical insulation tube 46 of the sheet metal may be radially enlarged to form a flared end which has a diameter slightly greater than the diameter of the insulation tube 46, as shown in FIG. 8.

The manufacturing and assembly procedure of the oil tube 42 with the integrated insulation tube 46 may further include a step of inserting the oil tube 42 with the end portion 49 as a forward end into the insulation tube 46 from the flared end thereof, until the opposed ends of the insulation tube 46 rest on the respective shoulders 54a, 54b. The insulation tube 46 may be then secured to the oil tube 42 by applying a weld or braze between the opposed ends of the insulation tube 46 and the respective shoulders 54a, 54b, as shown in FIG. 9.

The metal sleeve 56 may be attached around the insulation tube 46 at the flared end thereof after the insulation tube is secured to the oil tube 42, as shown in FIG. 10, and then is secured to the insulation tube 46 by applying a weld or braze thereto.

Figure 2:
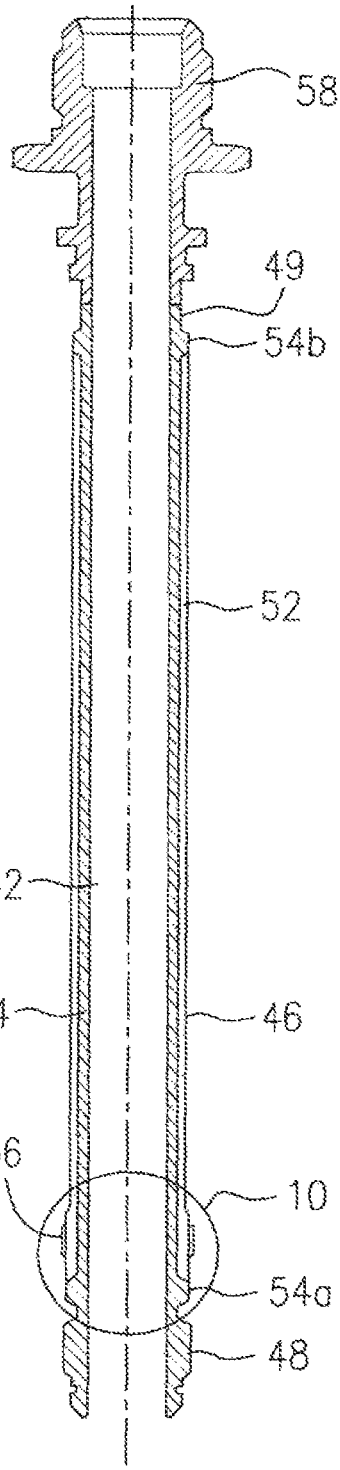
FIG. 2 is a cross-sectional view of an oil tube integrated with an insulation tube and a connector, used in the gas turbine engine of FIG. 1.
Figure 6:
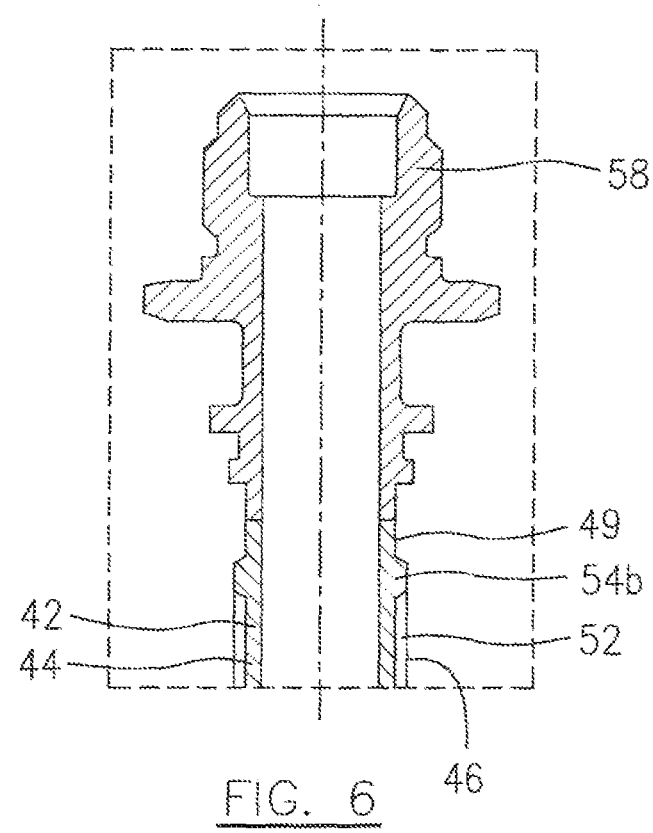
FIG. 6 is a partial cross-sectional view of the oil tube of FIG. 2, showing a connector affixed to an outer end of the oil tube.

The next step of the procedure may be the attachment of the connector 58 to the end portion 49 of the oil tube 42, as shown in FIG. 2. The connector 58 may be also welded or brazed to the oil tube 42.

A final step of the procedure may be machining such as grounding the annular outer surface of the metal sleeve 56 in order to obtain an adequate round surface condition for the sealing efficiency.

The above description is meant to be exemplary only, and one skilled in the art will recognize that changes may be made to the embodiments described without department from the scope of the described subject matter. For example, the oil tube as described is installed in a mid turbine frame, as an example to illustrate the application of the oil tube. Nevertheless, it is understood that the oil tube may be installed in engine case assemblies of other types, or in an engine of the type other than the illustrated turbofan gas turbine engine. Still other modifications which fall within the scope of the described subject matter will be apparent to those skilled in the art, in light of a review of this disclosure, and such modifications are intended to fall within the appended claims.

The invention claimed is:

1. A gas turbine engine comprising an array of hollow airfoils within an annular duct supported in an engine case assembly and a heat insulation system for an oil tube extending through one of the hollow airfoils, the heat insulation system including an insulation tube surrounding the oil tube and extending substantially along a length of the oil tube, the insulation tube having one of a weld and a braze joint at each of its opposed ends which integrally and sealingly connect the insulation tube to the oil tube, thereby defining a dead air annulus between the oil tube and the insulation tube;

wherein the opposed ends of the insulation tube surrounds a tubular body of the oil tube and are affixed to respective annular shoulders disposed at respective opposed first and second end portions of the oil tube and projecting outwardly with respect to the tubular body; and wherein the insulation tube comprises a metal sleeve around and affixed to an outer surface of the insulation tube near the first end portion of the oil tube.

2. The gas turbine engine as defined in claim 1 comprises a seal arrangement between a machined annular outer surface of the sleeve and an opening defined in an annular inner case of the engine case assembly for receiving the first end portion of the oil tube.

3. The gas turbine engine as defined in claim 1 further comprising a connector affixed to the second end portion of the oil tube.

4. The gas turbine engine as defined in claim 3 wherein the connector is sealingly received in an opening defined in an annular outer case of the engine case assembly, projecting outwardly from the annular outer case.

5. The gas turbine engine as defined in claim 1 wherein the hollow airfoil accommodating the oil tube is in fluid communication with a cooling air source.

6. A gas turbine engine having an oil tube for delivering oil through a high temperature zone of the engine to an engine component, the oil tube comprising:
   a tubular body extending in a substantial length of the oil tube and axially between opposed end portions, each of the end portions including an annular shoulder extending radially outwardly with respect to the tubular body; and
   an insulation tube surrounding the tubular body, the insulation tube having opposed ends integrally and sealingly affixed to the respective annular shoulders, thereby defining a sealed annulus between the tubular body and the insulation tube, the insulation tube including a metal sleeve around and affixed to an outer surface of the insulation tube near one of the end portions of the oil tube.

7. The gas turbine engine as defined in claim 6, wherein the insulation tube has a tubular wall thinner than a wall of the tubular body of the oil tube.

8. The gas turbine engine as defined in claim 6, wherein the insulation tube comprises a tubular wall of sheet metal.

9. The gas turbine engine as defined in claim 6, wherein the metal sleeve comprises a machined annular outer surface.

10. The gas turbine engine as defined in claim 6, wherein the insulation tube is substantially cylindrical with at least one flared end portion.

11. A method for fabricating an oil tube with integrated heat shield for a gas turbine engine, comprising
   (a) providing an oil tube having an annular shoulder located at each of opposed ends of the oil tube, the shoulders radially outwardly extending with respect to a tubular body which extends between the opposed ends;
   (b) providing an insulation tube and attaching a metal sleeve around the insulation tube at one end of the insulation tube and securing same to the insulation tube by applying one of weld and braze;
   (c) inserting the oil tube into the insulation tube until the two shoulders are adjacent to opposed ends of the insulation tube, respectively; and
   (d) securing the ends of the insulation tube to the respective shoulders by applying one of weld and braze.

12. The method as defined in claim 11 wherein step (b) is practised in substeps of:
   (1) providing a piece of sheet metal;
   (2) rolling the piece of sheet metal to shape a cylindrical insulation tube; and
   (3) applying one of weld and braze to seal an axial seam of the cylindrical insulation tube.

13. The method as defined in claim 11 further comprising a step between steps (b) and (c), the step comprising radially expanding an end of the insulation tube to make the end in a flared shape.

14. The method as defined in claim 13 wherein step (c) is practised as inserting the oil tube into the insulation tube from the end in the flared shape.

15. The method as defined in claim 11 further comprising steps of attaching a connector to an end of the oil tube and securing same to the oil tube by applying one of weld and braze, the connector being attached to the end distal to the attached metal sleeve.

16. The method as defined in claim 11 further comprising a step of machining an annular outer surface of the metal sleeve.

\* \* \* \* \*